(12) United States Patent
Masotti et al.

(10) Patent No.: US 9,945,129 B2
(45) Date of Patent: Apr. 17, 2018

(54) METHOD FOR MAKING A COVERING (71) Applicant: WOOD-SKIN S.R.L.S., Milan (IT)

(72) Inventors: Giulio Masotti, Milan (IT); Stefano Baruffaldi, Gera Lario (IT); Gianluca Lo Presti, Milan (IT); Susanna Todeschini, Milan (IT)

(73) Assignee: WOOD-SKIN S.R.L.S., Milan (IT)

( * ) Notice: Subject to any disclaimer, the term of this patent is extended or adjusted under 35 U.S.C. 154(b) by 0 days.

(21) Appl. No.: 14/651,032

(22) PCT Filed: Jan. 7, 2014

(86) PCT No.: PCT/IB2014/058099
§ 371 (c)(1),
(2) Date: Jun. 10, 2015

(87) PCT Pub. No.: WO2014/106828
PCT Pub. Date: Jul. 10, 2014

(65) Prior Publication Data
US 2015/0315797 A1    Nov. 5, 2015

(30) Foreign Application Priority Data

Jan. 7, 2013 (IT) .............................. MI2013A0010

(51) Int. Cl.
*E04F 13/077* (2006.01)
*B29C 53/06* (2006.01)
(Continued)

(52) U.S. Cl.
CPC .......... *E04F 13/077* (2013.01); *B29C 53/063* (2013.01); *B32B 1/00* (2013.01);
(Continued)

(58) Field of Classification Search
CPC .................................................... E04F 13/077
(Continued)

(56) References Cited

U.S. PATENT DOCUMENTS 2,018,712 A * 10/1935 Elmendorf ............... B27D 1/06
144/346
2,069,668 A *  2/1937 Flint ........................ B65D 9/34
217/2
(Continued)

FOREIGN PATENT DOCUMENTS

CN       101078238 A    11/2007
EP         1406190 A *   4/2004
(Continued)

OTHER PUBLICATIONS

Notification of the First Office Action for Chinese Patent Application No. 201480003711.2 filed on behalf of Wood-Skin S.R.L.S. dated May 19, 2016. 17 pages. Chinese original + English translation.
(Continued)

Primary Examiner — Jeffry H Aftergut
(74) Attorney, Agent, or Firm — Steinfl + Bruno LLP (57) ABSTRACT

A method for making a covering is described. The covering includes a first layer made of a flexible material; a second and a third layers made of a preferably rigid material engaged on opposite sides to the first layer. The second and the third layers respectively have a plurality of V-shaped grooves defining respective adjacent rigid and corresponding structural portions. Each rigid structural portion can be oriented with respect to the adjacent rigid structural portion, by folding the first layer so as to model the covering according to three-dimensional configurations and/or a simple or double curvature. The method is preferably performed through a virtual designing of the shape desired to be obtained and a processing of the same for the obtainment of the grooves required to attain such shape.

8 Claims, 7 Drawing Sheets

(51) Int. Cl.
*E04B 1/32* (2006.01)
*E04B 7/10* (2006.01)
*B32B 7/12* (2006.01)
*B32B 15/08* (2006.01)
*B32B 21/08* (2006.01)
*B32B 27/30* (2006.01)
*B32B 27/34* (2006.01)
*B32B 1/00* (2006.01)
*B32B 3/12* (2006.01)
*B32B 3/30* (2006.01)
*B32B 37/18* (2006.01)
*B32B 37/12* (2006.01)
*B32B 38/00* (2006.01)
*B29L 9/00* (2006.01)
*E04B 2/72* (2006.01)
*B32B 38/10* (2006.01)

(52) U.S. Cl.
CPC ............... *B32B 3/12* (2013.01); *B32B 3/30* (2013.01); *B32B 7/12* (2013.01); *B32B 15/08* (2013.01); *B32B 21/08* (2013.01); *B32B 27/304* (2013.01); *B32B 27/34* (2013.01); *E04B 1/32* (2013.01); *E04B 7/107* (2013.01); *B29L 2009/00* (2013.01); *B32B 37/1284* (2013.01); *B32B 37/18* (2013.01); *B32B 38/0012* (2013.01); *B32B 38/10* (2013.01); *B32B 2038/0016* (2013.01); *B32B 2305/38* (2013.01); *B32B 2307/558* (2013.01); *B32B 2419/00* (2013.01); *B32B 2419/04* (2013.01); *B32B 2419/06* (2013.01); *B32B 2607/00* (2013.01); *E04B 2001/3276* (2013.01); *E04B 2001/3294* (2013.01); *E04B 2002/725* (2013.01); *Y10T 156/10* (2015.01); *Y10T 156/1082* (2015.01)

(58) Field of Classification Search
USPC .................................................. 156/257, 154
See application file for complete search history.

(56) References Cited

U.S. PATENT DOCUMENTS

| | | | | |
|---|---|---|---|---|
| 2,556,884 | A | * | 6/1951 | Muller .................. E04B 1/8409 181/290 |
| 5,555,989 | A | * | 9/1996 | Moran, Jr. ............... H02B 1/40 220/3.94 |
| 2011/0081514 | A1 | | 4/2011 | Day et al. |

FOREIGN PATENT DOCUMENTS

| | | | |
|---|---|---|---|
| JP | S5591657 A | | 7/1980 |
| JP | S61501861 A | | 8/1986 |
| JP | H07119239 | | 5/1995 |
| JP | H08137940 A | | 5/1996 |
| JP | H11105120 A | | 4/1999 |
| JP | 2004521288 A | | 7/2004 |
| JP | 2012-73233 A | * | 4/2012 |
| WO | 8504922 A1 | | 11/1985 |
| WO | 95/07392 A1 | | 3/1995 |
| WO | 02/095154 | | 11/2002 |
| WO | 02/095154 A1 | | 11/2002 |

OTHER PUBLICATIONS

Written Opinion for Singapore Patent Application No. 11201505242U filed Jan. 7, 2014 on behalf of Wood-Skin S.R.L.S. Written Opinion: dated Feb. 19, 2016. 6 pages.
International Search Report dated May 2, 2014 for PCT/IB2014/058099 filed on Jan. 7, 2014 in the name of Wood-Skin S.R.L.S.
Written Opinion dated May 2, 2014 for PCT/IB2014/058099 filed on Jan. 7, 2014 in the name of Wood-Skin S.R.L.S.
Japanese Patent Office Official Action for Japanese Patent Application No. 2015-551244, dated Dec. 18, 2017. 7 pages. (English Translation + Japanese Original).

\* cited by examiner

METHOD FOR MAKING A COVERING

CROSS REFERENCE TO RELATED APPLICATIONS

The present application is the US national stage of International Patent Application PCT/IB2014/058099 filed on Jan. 7, 2014 which, in turn, claims priority to Italian application MI2013A000010 filed on Jan. 7, 2013.

The present invention refers to a method for making a covering.

The purpose of the present invention falls within the building materials and/or furnishing articles and interior design industry.

As known, the covering for surfaces or more or less complex structures, externally and/or internally the building structures, such as for example houses, hotels, shops, gyms, public administration buildings and/or similar infrastructures, is normally carried out by means of respective cover panels of the modular type and/or similar structures suitably designed and made by artisans and/or modellers.

Obviously, when the aforementioned surfaces or the structures have a regular development, the application of the known coverings does not give rise to particular inconveniences.

On the contrary, when the surfaces and/or structures to be covered are complex, having particularly irregular surface developments and shapes, there arises the need to provide coverings specially dedicated thereto.

Obviously, the production of tailored coverings, such as for example the boiseries and/or the like, suitably modelled for reproducing irregular and/or rounded shapes, requires long manufacturing times and complex installation solutions which have a considerable impact on the costs required for such operations.

The main purpose of the present invention is to provide a method to make a covering capable of overcoming the drawbacks observed in the prior art.

A purpose of the present invention is to provide a method for making a covering that is easily and quickly adaptable to the surfaces and/or to the structures to be covered, even to particularly complex ones.

A further purpose of the present invention is to provide a method for making a covering capable of taking irregular shapes depending on the contingent needs.

Another purpose of the present invention is to provide a method for making a covering that is capable of reproducing both concave and convex rounded shapes.

A purpose of the present invention is to provide a method for making a covering that is easy and simple to transport, install and model.

A purpose of the present invention is also to provide a method that is quick and inexpensive.

Lastly, a purpose of the present invention is to provide a method that is simple and easy to implement. These and other purposes are substantially attained by a method for making a covering as outlined and described in the following claims.

Now, the description of a preferred but non-exclusive embodiment of a method for making a covering, according to the present invention, is outlined by way of example.

Such description shall be outlined hereinafter with reference to the attached drawings, provided solely by way of non-limiting example, wherein.

With reference to FIGS. 1 to 6, a covering which can be made through the method according to the present invention is indicated in its entirety with number 1.

Figure 5:
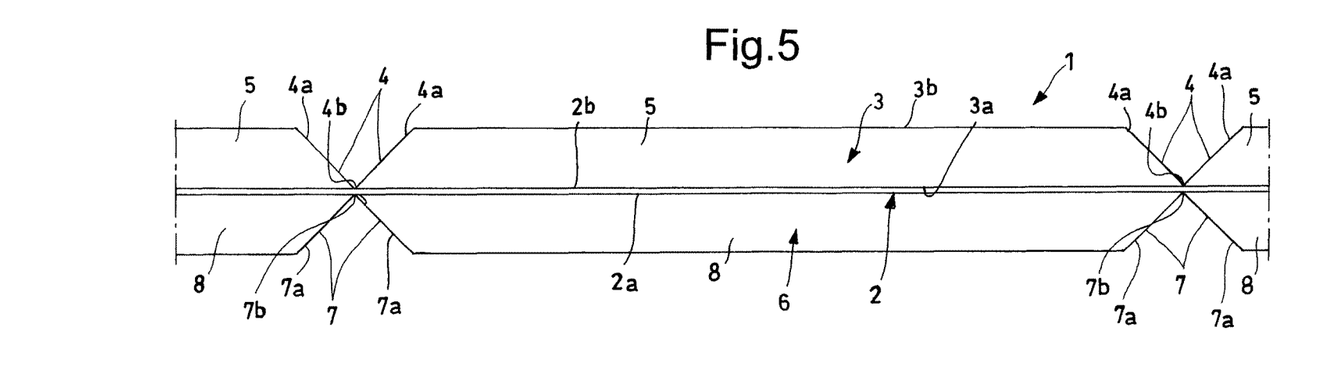
FIG. 5 is an interrupted section of the covering of the previous figures, illustrated according to a flat development.
Figure 6:
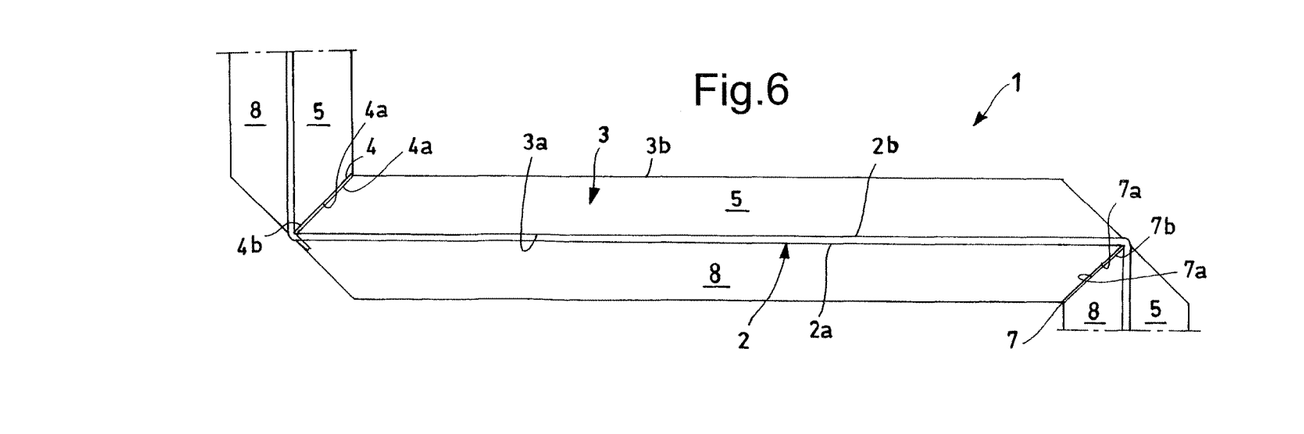
FIG. 6 is an interrupted section of the covering of the previous figures, illustrated in an irregular configuration.
Figure 7:
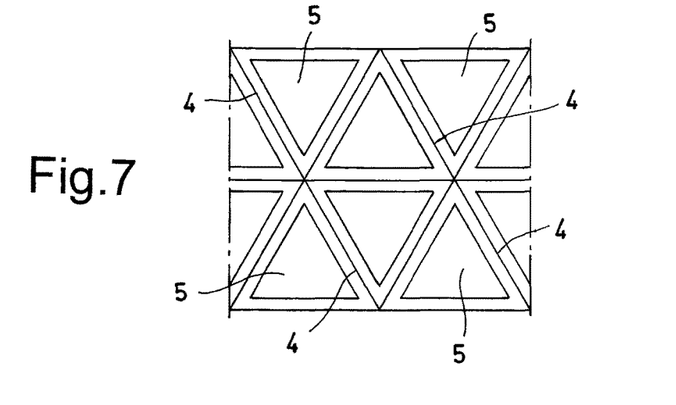
FIG. 7 is a schematic view of a first pattern which can be made on the covering of FIGS. 1 to 6.

As observable in FIGS. 5 and 6, the covering 1 comprises a first layer 2 made of a flexible material having a first and a second surface 2a, 2b respectively facing opposite sides.

Advantageously, the first layer 2 comprises a flexible membrane.

Preferably, the first layer 2 comprises a rubber-coated net made of synthetic material, such as polyamides, polyaramides, such as for example Nylon, Dyneema®, fabric-coated PVC, or textile fibres in general, even natural, such as for example Nylon, Dyneema®, fabric-coated PVC, even integrated with woven fibres to form one or more grids defining a plurality of respective through openings.

The covering 1 comprises a second layer 3 made of a rigid material having a first surface 3a engaged to the second surface 2b of the first layer 2 and a second surface 3b facing the opposite side with respect to the first surface 3a.

The second layer 3 may advantageously be made of wood and/or metal and/or plastics and/or any other composite material that is suitable for the making thereof, such as for example an aggregate of cork, fibre and resin.

The second layer 3 may also be made using any rigid material that can be printed or milled.

Advantageously, the second layer 3 has at least one groove 4 provided with two surfaces 4a which extend transversally with respect to each other joining at a respective vertex 4b arranged preferably close to or at the first layer 2.

As observable in FIGS. 5 and 6, the groove 4 defines respective adjacent rigid structural portions 5. Each rigid structural portion 5 of the second layer 2 can be advantageously oriented with respect to the adjacent rigid structural portion 5, by folding the first layer 2, between a first position (not represented in the figures), wherein the first layer 2 is folded on itself and the rigid structural portions of the second layer 5 are faced towards respectively opposite sides, and a second position, wherein the rigid structural portions 5 (FIG. 6) are arranged transverse to each other with the surfaces 4a of the respective groove 4 mutually at contact.

According to the embodiment solution illustrated in FIGS. 1 to 6, the covering 1 further comprises a third layer 6 made of a substantially rigid material, preferably identical to the material used for the second layer 3. The third layer 6 has a first surface 6a engaged to the first surface 3a of the first layer 3 and a second surface 6b faced on the opposite side with respect to the first surface 6a.

Similarly to the second layer 3, the third layer 6 has at least one groove 7, in particular corresponding to the groove 4 of the second layer 3, having two surfaces 7a joining at a vertex 7b arranged close to or at the first layer 2.

Preferably, the groove 7 of the third layer 6 defines respective adjacent rigid structural portions 8, each corresponding to a respective rigid structural portion 5 of the second layer 3.

As observable in FIGS. 5 and 6, the corresponding rigid structural portions 5, 8, of the second and of the third layers 3, 6, are orientable between a first position (FIG. 6, left side), wherein the surfaces 4a of the groove 4 of the third layer 3 are in mutual contact and a second position (FIG. 6, right side), wherein the surfaces 7a of the groove 7 of the third layer 6 are in mutual contact.

More in detail, each of the layers 3, 6 has a plurality of grooves 4, 7 defining respective pluralities of adjacent rigid structural portions 5, 8.

As observable in FIG. 5, the grooves 4 and the rigid structural portions 5 of the second layer 3 correspond to the grooves 7 and to the rigid structural portions 8 of the third layer 6.

According to such solution, the first layer 2 is foldable along the corresponding grooves 4, 7 of the second and third layers 3, 6 to allow different orientations between pairs of adjacent rigid structural portions 5, 8.

With the aim of guaranteeing great mobility between each rigid structural portion 5, 8 and the other adjacent rigid structural portions 5, 8, each groove 4, 7 of the second and third layers 3, 6 advantageously have a substantially V-shaped profile the vertex 4b, 7b of which defines an angle which is established during the making of the covering 1. In detail, with reference to FIG. 5, in which the covering 1 extends substantially along a single laying plane, the angle defined by each groove 4, 7 has a width of about 90°. However, it should be observed that the gradient of the surfaces of the grooves 4, 7 may vary depending on the needs, so as to define angles the width of which may vary between 0° and 180°, in particular between 30° and 160°.

In addition, still with reference to FIG. 5, it is preferable to provide that the grooves 4, 7 of the second and third layers 3, 6 have substantially symmetric profiles. However, it should be taken into account that it is also possible to provide grooves 4, 7 with asymmetric shapes, wherein the surfaces 4a, 7a of the latter define, with a common reference plane, such as for example the laying plane of the covering 1 in the position of FIG. 5, angles of incidence of different widths.

Advantageously, the rigid structural portions 5, 8 have substantially polygonal shapes, optionally regular or irregular. However, it should be observed that there can be provided rigid structural portions 5, 8 the polygonal shapes of which differ from the polygonal shapes of the adjacent rigid structural portions 5, 8.

According to the embodiment illustrated in FIGS. 1 to 4 and 7, the rigid structural portions 5, 8 have a profile or shape which is substantially an equilateral triangle but they may take substantially irregular shapes, triangular but also polygonal or curved.

Figure 8:
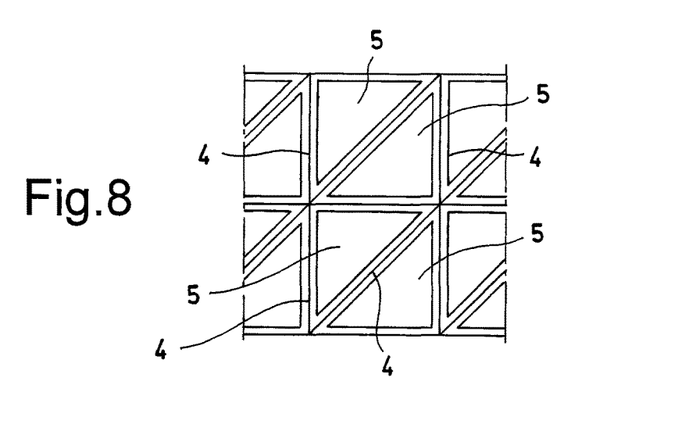
FIG. 8 is a schematic view of a second pattern which can be made on the covering of FIGS. 1 to 6.

According to a further embodiment illustrated in FIG. 8, the rigid structural portions 5, 8 have a profile or shape which is substantially an isosceles triangle.

Figure 9:
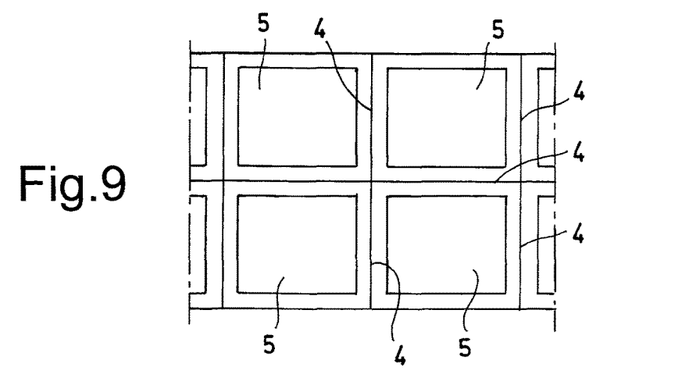
FIG. 9 is a schematic view of a third pattern which can be made on the covering of FIGS. 1 to 6.

According to the embodiment illustrated in FIG. 9, the rigid structural portions 5, 8 have a substantially quadrangular profile or shape, in particular square.

Figure 10:
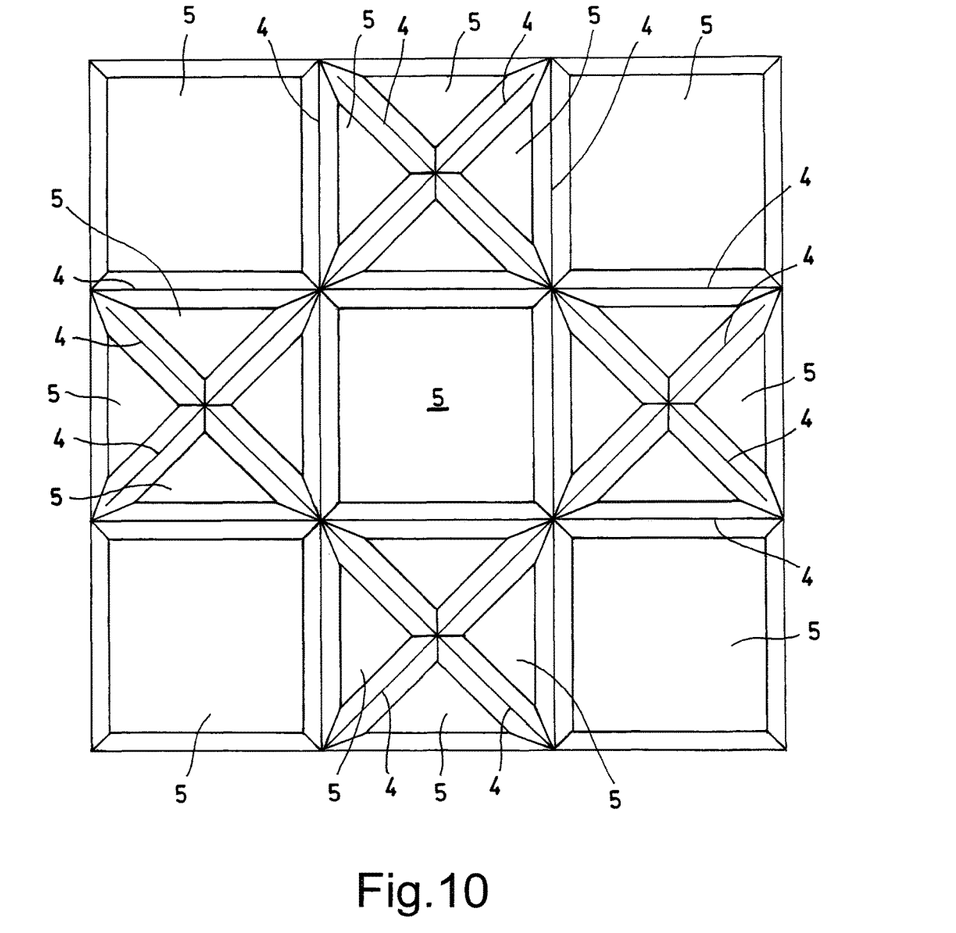
FIG. 10 is a schematic view of a fourth pattern which can be made on the covering of FIGS. 1 to 6.

According to the embodiment illustrated in FIG. 10, the structural portions have different profiles or shapes. In particular, some rigid structural portions 5, 8 have a substantially square profile, whereas other rigid structural portions 5, 8 have a substantially triangular profile. In this case, each rigid structural portion 5, 8 borders with four triangular rigid structural portions 5, 8, each of which in turn borders with other two triangular rigid structural portions 5, 8.

Obviously, there are several available shapes and they may be selected depending on the number and the arrangement of the folding lines intended to be created on the covering 1.

The aforementioned covering 1 is mainly intended for covering previously existing surfaces and/or structures. However, the structural features of the covering 1 are such to allow the use as a bearing structure capable of sustaining and supporting considerable loads. Thus, according to such feature, the covering 1 can be used as a casing, even of the bearing type, for structures, skeletons and/or similar support grids forming and constituting thereon a furnishing element, a partition wall or any other surface or structure suitable for supporting predetermined loads.

According to the present invention, the covering shall thus not be solely intended as an element for covering surfaces and/or structures, but it may also be intended as a furnishing element or self-supporting wall, or as a support structure.

The aforementioned covering 1 is advantageously made through a method comprising the preliminary steps of providing the first layer 2, the second layer 3 and the third layer 6.

Subsequently, the method provides the engagement, preferably by gluing, of the second and the third layers 3, 6 to the first layer 2, so as to define a multilayer structure having a flexible core and rigid covers.

The engagement of the second and the third layers 3, 6 to the first layer 2 provides a number of different operations. Firstly, a glue or a similar adhesion substance is applied both onto the first surface 3a of the second layer 3 and onto the first surface 6a of the third layer 6. Then, the first layer 2 is arranged on the second layer 3 and the third layer 6 on the first layer 2 on the side opposite to the second layer 3.

In detail, the first layer 2 is arranged on the second layer 3 so that the second surface 2b of the first layer 2 engages the glue applied on the first surface 3a of the second layer 3.

The third layer 6 is in turn arranged on the first layer 2 so that the glue applied on the first surface 6a of the third layer 6 engages the first surface 2a of the first layer 2.

Once all the layers 2, 3, 6, have been joined together, a pressing thereof is performed, which facilitates the adhesion thereof.

As the step of providing the first layer 2 advantageously provides the presence of a net which has a plurality of through openings, the arrangement of the first layer 2 on the second layer 6 and the third layer 6 on the first layer 2 determines the embedding of the net of the first layer 2 in the glue applied on the second and on the third layers 3, 6. In this context, the glue applied on the second and on the third layers 3, 6 winds the net of the first layer 2 and fills in the through openings of the latter so as to directly join the second layer 3 to the third layer 6 through such openings.

Advantageously, being an expansion glue, optionally a polyurethane or silicon glue or a similar glue, the latter is capable of suitably trapping the net of the first layer 2 between the second and the third layers 3, 6.

The method further comprises a step of making, optionally by removing material, preferably by milling, in the second layer 3 and in the third layer 6, at least one groove 4, 7, preferably a plurality, so as to define respective adjacent rigid structural portions 5, 8 corresponding to the rigid structural portions 5, 8 of the other layer 3, 6.

The making of each groove 4, 7 is advantageously performed by obtaining a cavity having a substantially V-shaped profile, the vertex of which is arranged close to or at the first layer 2.

Once the V-shaped grooves 4, 7 have been made, the method also provides a step of calibration of the covering 1 comprising at least one step of reducing the thickness of the second layer 3 and/or the third layer 6.

In detail, the calibration step provides that the covering 1 is placed onto a work surface (not illustrated), preferably of the suctioning type. Subsequently, the covering 1 is locked on the aforementioned work surface, preferably through a suctioning action which maintains it adhered to the same plane. Once the covering 1 has been locked on the work surface, it is possible to proceed with the polishing of the second layer 3. The polishing of the second layer 3 reduces the thickness of the same up to a predetermined value levelling off the latter. Subsequently, it is possible to proceed with the polishing of the third layer 6 for reducing the thickness of the latter up to a predetermined value, preferably corresponding to the thickness of the second layer 3, and levelling off the same.

Advantageously, the previously described method provides a preliminary step of designing the covering 1 which precedes the execution of the grooves 4, 7 of the second and third layers 3, 6.

In detail, the design of the covering 1 may preferably require that a final three-dimensional shape to be made is established a priori, then, that the number and the orientations of the V-shaped grooves 4, 7 to be made on the second and on the third layers 3, 6 are determined for allowing the covering 1 to take, in the mounting step, the established three-dimensional shape.

The three-dimensional shape of the covering 1 to be made may be established in various ways. It is possible to create, through appropriate three-dimensional modelling programs, a virtual three-dimensional model of a structure or volume intended to be made.

It is also possible to import previously existing virtual three-dimensional models or generate virtual three-dimensional models from the detection of the three-dimensional shape of actually existing structures or volumes.

The determination of the number and the orientations of the grooves 4, 7 is performed by processing the virtual previously established three-dimensional model and executing and displaying a preview of the structural configuration of the covering 1 corresponding to the established final shape.

Advantageously, both the initial virtual three-dimensional model and the preview of the structural configuration of the covering 1 can be modified in the shape and in the aspect depending on the needs.

The execution and display of the preview of the structural configuration of the covering 1 may be advantageously performed according to the shape of the virtual three-dimensional model established at the beginning and/or the shape of the rigid structural portions 5, 8 to be made on the second and on the third layers 3, 6 and/or the number of the rigid structural portions 5, 8 to be made on the second and on the third layers 3, 6 and/or the arrangement of the rigid structural portions 5, 8 to be made on the second and on the third layers 3, 6 and/or the thickness of the second and third layers 3, 6 of the covering 1 and/or the material of the second and third layers 3, 6 and/or the finishing to be performed on such layers 3, 6.

Advantageously, the virtual three-dimensional model established at the beginning of the designing process is suitably analysed for estimating the stresses and/or the loads and/or the surface tensions generated on the corresponding covering 1, in the final configuration thereof.

Advantageously, the analysis of the virtual three-dimensional model allows the identification of areas or zones that require respective support points and/or self-supporting areas or zones, thus allowing to manage the provision of the supports required for making the end structure.

More in detail, the method also provides for: the storage of a final three-dimensional model corresponding to the covering 1 intended to be made; the processing of the shape of the final three-dimensional model for making, in a plane, on the second and third layers 3, 6 the V-shaped grooves 4, 7 required for obtaining the three-dimensional shape of the latter; and, the determination of a list of controls for controlling a machine, preferably a numeric control machine, provided for making, in a plane, on the second layer 3 and on the third layer 6 of the covering 1, the V-shaped grooves 4, 7 required for obtaining the three-dimensional shape intended to be obtained.

The covering according to the present invention overcomes the problems of the prior art and attains considerable advantages.

First of all, the covering according to the present invention can be easily modelled to take three-dimensional configurations and reproduce curvatures which would normally require the making of specially prepared panels. In fact, orienting each rigid structural portion with respect to the adjacent rigid structural portions it is possible to confer to the covering a shape ideal for the installation thereof on a respective surface or structure to be covered.

Figure 1:
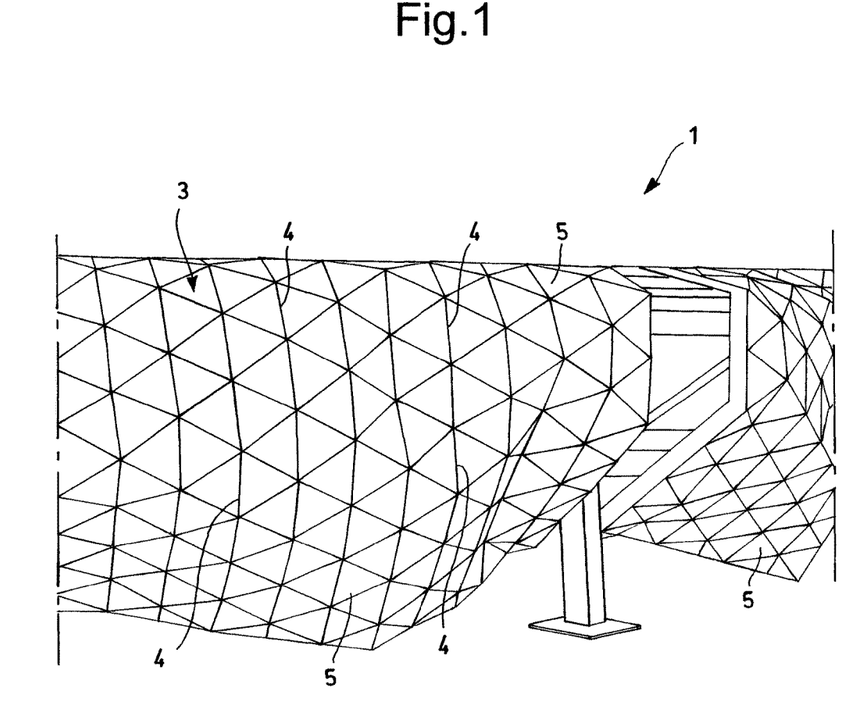
FIG. 1 is an external perspective view of a covering, according to the present invention.
Figure 2:
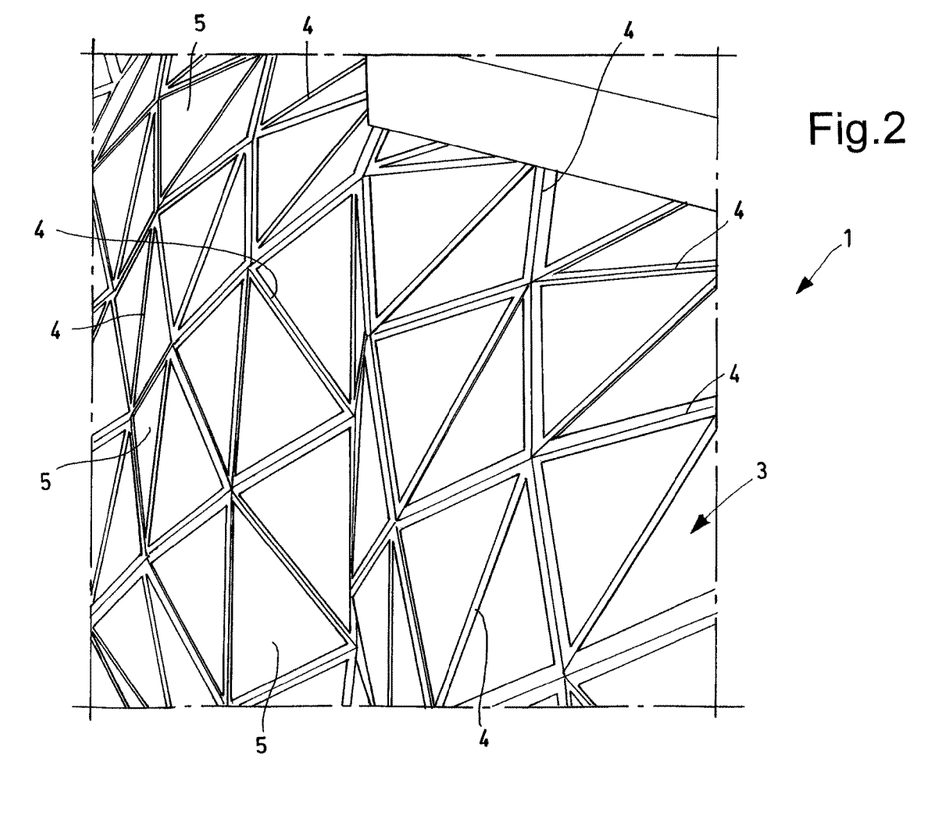
FIG. 2 is a perspective enlargement of a detail of the covering of FIG. 1.
Figure 3:
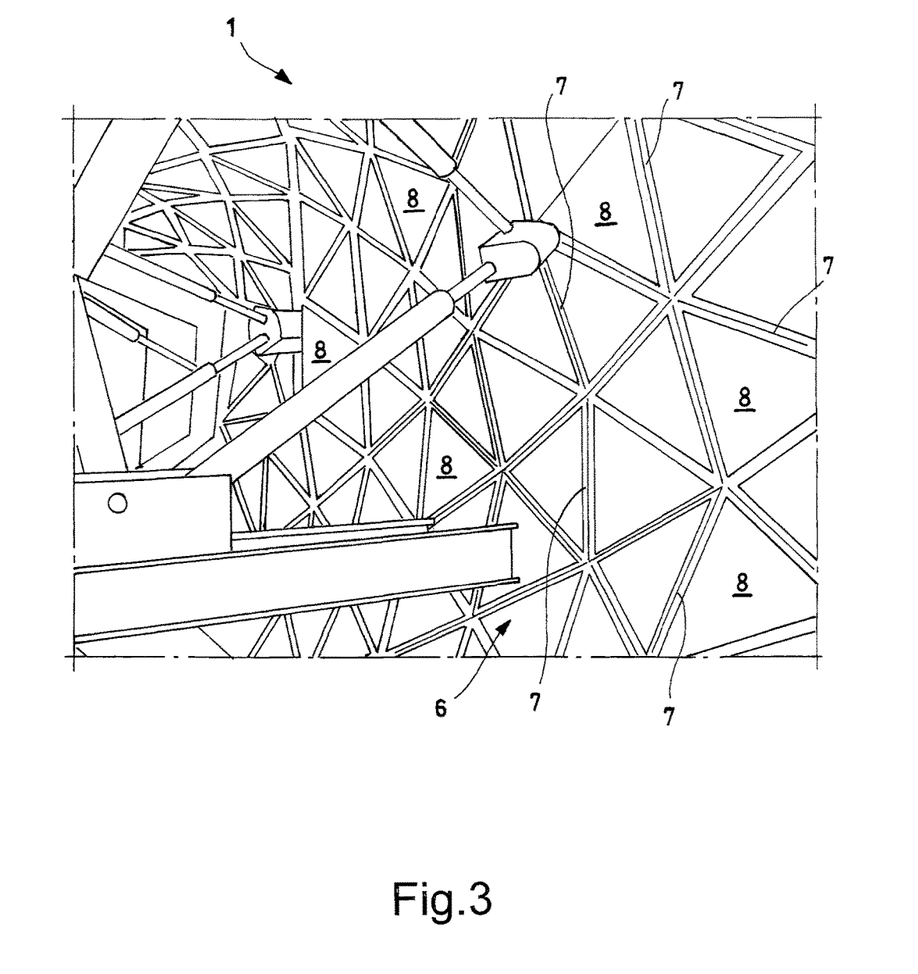
FIG. 3 is a perspective view of the covering of the previous figure, illustrated by a support structure of the same.
Figure 4:
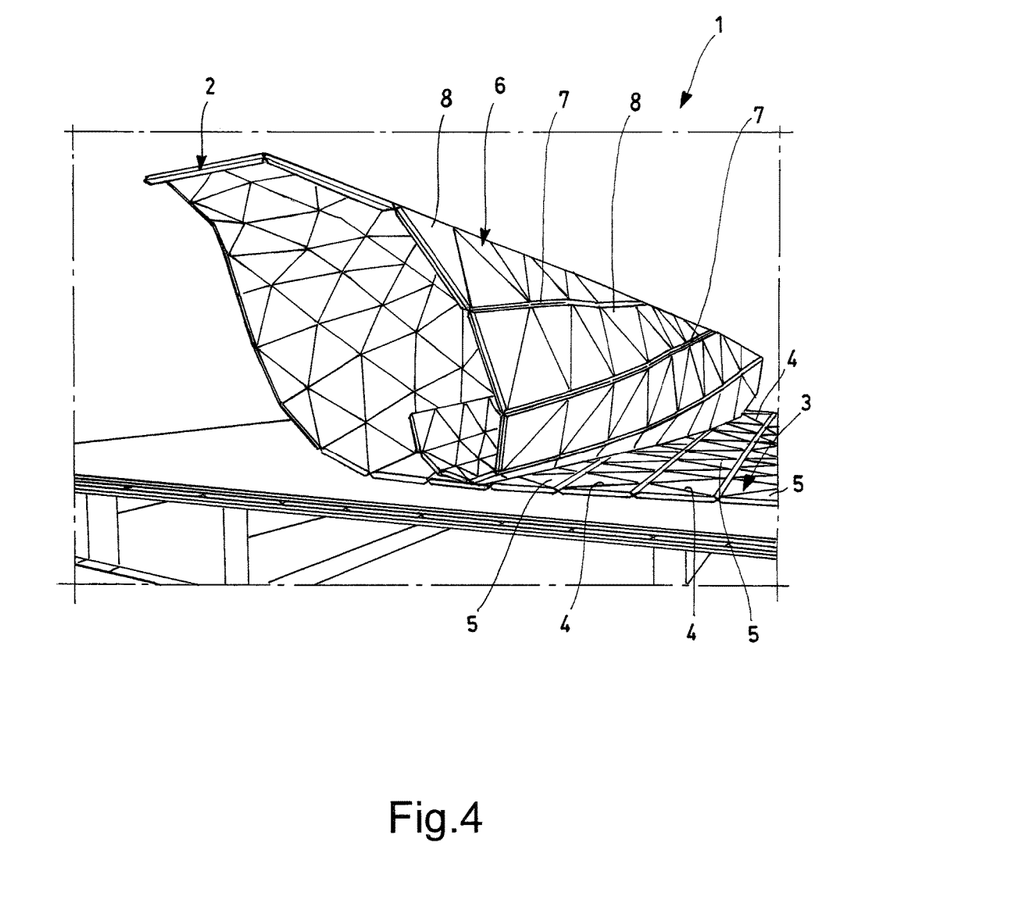
FIG. 4 is a perspective view of the covering of the previous figures, illustrated in a configuration suitable for transport or storage.

In addition, it should be noted that the pliability of the covering allows the simple and easy transport and storage thereof. Actually, the covering may be rolled like a pipe, as illustrated in FIG. 4, or extended like a carpet, as represented in FIG. 5.

Making a covering that can be adapted and modelled as a function of the intended structure or surface allows avoiding the making of complex and expensive covering structures which are properly designed and made by artisans and/or modellers, considerably reducing the overall costs for the covering to be made and installed.

In addition, it should be noted that the virtual design of the covering allows the making, in a plane, of the grooves required for obtaining, in the mounting and final modelling step, the shape established before the making of the grooves themselves. This process allows obtaining, in an economic and rapid manner, covering plates that can easily take the defined shape during the design.

The invention claimed is:

1. A method for making a covering for complex structures comprising the steps of:
   providing a first layer made of a flexible material having a first and a second surface facing respectively opposite sides, by providing a net having a plurality of through openings;
   providing a second layer made of a substantially rigid material having a first surface and a second surface facing respectively opposite sides;
   fixing, said first surface of said second layer to said second surface of said first layer, by applying a glue or a similar adhesion substance onto said first surface of said second layer, and arranging said first layer onto said second layer so that the second surface of said first layer engages the glue placed on said first surface of said second layer;

providing a third layer made of a substantially rigid material having a first surface and a second surface facing respectively opposite sides;

fixing said first surface of said third layer to said first surface of said first layer, by applying a glue or a similar adhesion substance onto said first surface of said third layer, and by arranging said third layer onto said first layer on the opposite side with respect to said second layer so that the glue applied on the first surface of said third layer engages the first surface of said first layer;

pressing said first layer, second layer, and third layer against each other;

the arrangement of said first layer on said second layer and said third layer on said first layer causing embedding of said net of said first layer in said glue applied on said second and third layers, such that the glue applied on said second and third layers passes through said net of said first layer and fills the through openings of the latter so as to directly join said second layer to said third layer at said through openings;

designing a three-dimensional shape of the covering and determining number and orientations of grooves on the second and on the third layers to allow the covering to take, in a mounting step, an established three-dimensional shape, the established three-dimensional shape being established by creating a structural virtual three-dimensional model or by importing a previously existing structural virtual three-dimensional model or by generating a structural virtual three-dimensional model from detection of a real three-dimensional shape, the determination of the number and the orientations of the grooves being performed through a step of processing the established virtual three-dimensional model, the determination step comprising execution and display of a preview of the structural configuration of the covering corresponding to the established final shape;

storing the final three-dimensional model corresponding to the covering to be obtained;

processing the shape of said final three-dimensional model for obtaining, in a plane, on the second and the third layers, the grooves required for obtaining the three-dimensional shape of the latter;

determining a list of controls for controlling a numeric control machine, provided for obtaining, in a plane, on the second layer and the third layer of said covering, V-shaped grooves in order to obtain the determined three-dimensional shape;

obtaining, by removing material in said second layer at least one groove, so as to define adjacent rigid structural portions, the making of each groove being performed by obtaining a cavity having a substantially V-shaped profile, the vertex of which is arranged close to or at said first layer;

obtaining, by removing material, in said third layer at least one groove corresponding to the respective groove of said second layer, so as to define adjacent rigid structural portions, each corresponding to a respective rigid structural portion of said second layer, the obtaining of each groove being performed by forming a cavity having a substantially V-shaped profile, with a vertex arranged close to or at said first layer; and using a resulting covering to cover complex surfaces or structures, as a furnishing element, as a self-supporting wall, or as a support structure.

2. The method according to claim 1, wherein the glue applied on the second layer and on the third layer is an expansion glue, a polyurethane or silicon glue or a similar glue, capable of trapping the net of said first layer between said second and third layers.

3. The method according to claim 1, further comprising a step of calibrating said covering comprising a reduction of the thickness of said second layer and/or said third layer.

4. The method according to claim 3, wherein said step of calibration comprises the following steps:
placing said covering onto a work surface, the work surface being a suctioning one;
locking said covering on said work surface, by suction;
polishing said second layer for reducing the thickness of the same up to a predetermined value, the polishing of said second layer levelling off the same;
polishing said third layer for reducing the thickness of the latter up to a predetermined value, corresponding to the thickness of said second layer, the polishing of said third layer levelling off the same.

5. The method according to claim 1, wherein both the virtual three-dimensional model and the preview of the structural configuration of the covering can be modified to vary the shape thereof.

6. The method according to claim 1, wherein the step of execution and display of the preview of the structural configuration of the covering is performed on the basis of the shape of the established virtual three-dimensional model and/or of the shape of the rigid structural portions to be made and/or of the number of the rigid structural portions to be made and/or of the arrangement of the rigid structural portions to be made and/or on the thickness of the second and third layers of the covering and/or of the material of the second and of the third layers and/or of the finishing to be performed.

7. The method according to claim 1, further comprising the step of analysing the established virtual three-dimensional model for estimating the stresses and/or the loads and/or the surface tensions generated on the corresponding covering, the analysis of the virtual three-dimensional model allowing the identification of areas or zones requiring respective support points and/or self-supporting areas or zones.

8. The method according to claim 1, wherein the established three-dimensional shape is established by generating a structural virtual three-dimensional model from detection of a real three-dimensional shape.

\* \* \* \* \*